Sept. 9, 1941.  A. S. RIDLEY  2,255,533
FRUIT PITTING MACHINE
Filed Nov. 25, 1939  5 Sheets-Sheet 1

INVENTOR
Albert Stanley Ridley
By [signature]
his ATTY.

INVENTOR
Albert Stanley Ridley
By Ottohunk
his ATTY.

INVENTOR
Albert Stanley Ridley
By *(signature)*
his ATT'Y.

Sept. 9, 1941.    A. S. RIDLEY    2,255,533
FRUIT PITTING MACHINE
Filed Nov. 25, 1939    5 Sheets-Sheet 4

INVENTOR
Albert Stanley Ridley
By (signature)
his ATTY.

Sept. 9, 1941.  A. S. RIDLEY  2,255,533

FRUIT PITTING MACHINE

Filed Nov. 25, 1939  5 Sheets-Sheet 5

Albert Stanley Ridley
INVENTOR

By  his ATTY.

Patented Sept. 9, 1941

2,255,533

UNITED STATES PATENT OFFICE 2,255,533

FRUIT PITTING MACHINE

Albert Stanley Ridley, Kew, Victoria, Australia

Application November 25, 1939, Serial No. 306,093
In Australia January 18, 1939

4 Claims. (Cl. 146—28)

My invention relates to an improvement in fruit pitting machines and the object of my improvement is to provide means to locate each half pit, after division of the pit into two approximately equal halves, and to bring pitting blades into correct position in relation to said half pit irrespectively of the position of said half pit in relation to the flesh of the fruit.

I attain this object by mechanism illustrated in the accompanying drawings, in which—

Similar numerals refer to similar parts throughout the several views.

Figures 1, 2:
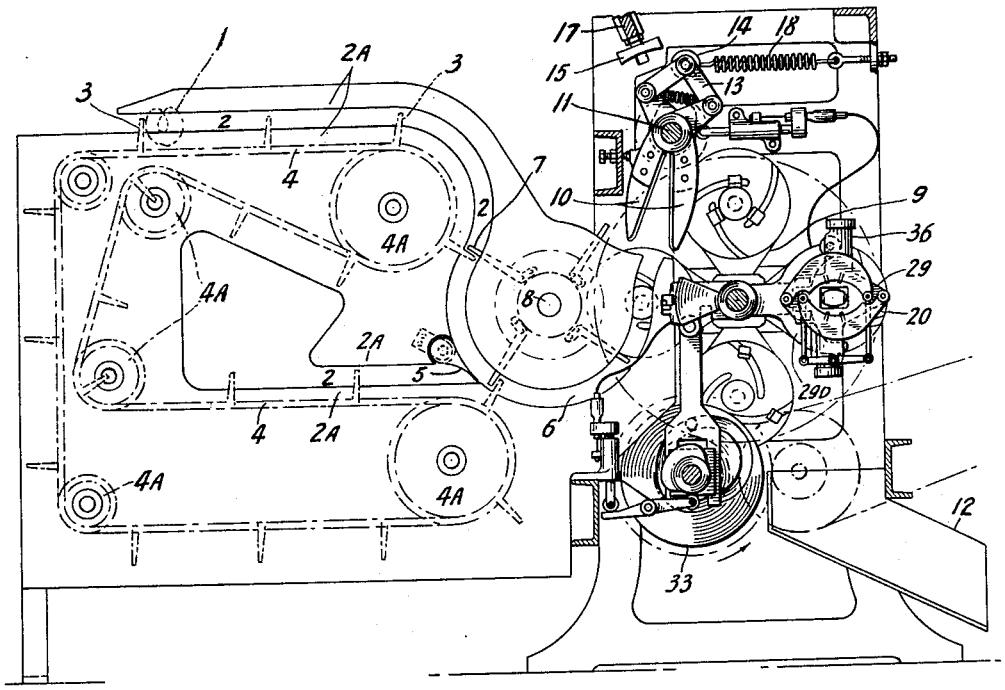
Figure 1 is a side elevation on line 1—1 of Figure 2 showing in addition in relatively light and simple outline known feeding mechanism.
Figure 2 is an end elevation looking from the discharge end of the machine.
Figure 3:
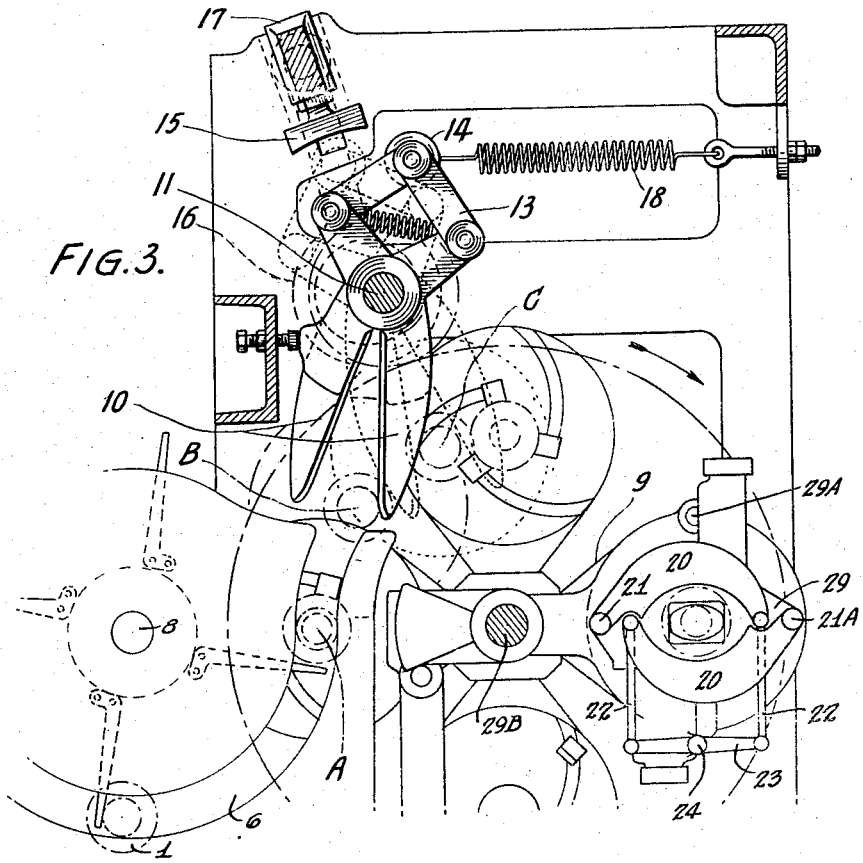
Figure 3 is an enlarged side elevation, on line 1—1 of Figure 2, of suitable pit-splitting means in the open position, other parts of the machine being shown in relatively light and simple outline in their relative positions.

The general operation of the mechanism is as follows:

The fruit is fed to the machine by any suitable means such, for example, as that shown in faint lines in Figure 1 according to which the fruit I is fed along two tributary guideways 2, each of which is formed of two opposed blades 2A on which the fruit is impaled. The fruit is pushed along the guideways by fingers 3 carried by a continuous chain 4 travelling around pulleys 4A, the lower guideway being provided with a pivoted gate 5. After leaving the fingers 3 the fruit is carried along a main guideway 6 by fingers 7 rotatably carried around a shaft 8. The fingers 7 move at twice the speed of the fingers 3 so as to receive the fruit alternately from the two tributary guideways. Just before leaving the main guideway 6, at approximately the point A in Figure 3, the fruit is gripped on each side by suitable fruit-carriers as, for example, those described in the specification of United States Patent No. 1,726,685, according to which two sets of fingers are slidable towards each other in each set to grip the fruit, a series of these pairs of sets of fingers being carried by a pair of rotating spiders 9. The dividing of the pits into two approximately equal halves may be effected by the means shown in Figures 1 to 4 of the accompanying drawings, according to which the fruit is first carried between opposed blades 10 of the pit-splitting means and contacts with one of these blades at approximately the point B in Figure 3. It then swings these blades around their pivotal joint 11 to approximately the point C in Figure 3 where the pit-splitting action is effected by causing the blades to close towards each other as hereinafter described. The flesh of the fruit has already been partly cut by the blades of the guideways and the closing of the pit-splitting blades completes the cutting of the flesh and splits the pit into two parts so that the fruit is divided into two parts, which normally will be approximately halves of the fruit. These halves are carried around by the fruit-carriers owing to the further rotation of the spiders 9 and during the first portion of that movement the two halves of the fruit are drawn apart from each other by lateral movement of the carriers. Each half of the fruit is then carried to pitting means with which is associated pit-locating means. The pit-locating means and associated parts form the subject of this invention. The pit-locating means closes on the outer face of the half pit and, as it is mounted in a freely floating manner on its support, it takes up a position corresponding to that of the half pit and simultaneously moves pitting means so that the pitting means is accurately positioned in relation to the half pit, with the result that on rotation of the pitting blades through portion of a revolution the half pit is severed in correct manner from the half fruit. The gripping fingers of the fruit-carrier then open out to release the fruit and the halves of the flesh and the halves of the pit fall into a discharge chute 12 (Figure 1) or the like. The feeding means, fruit-carrying means and pit-splitting means form no portion of this invention which resides in the pit-locating means and associated parts.

Figure 4:
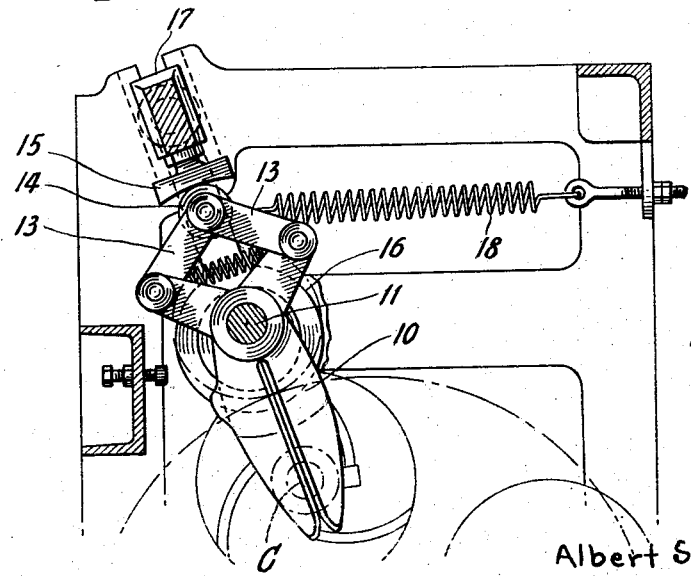
Figure 4 is an enlarged side elevation, on line 1—1 of Figure 2, of the pit-splitting means in the closed position.
Figure 5:
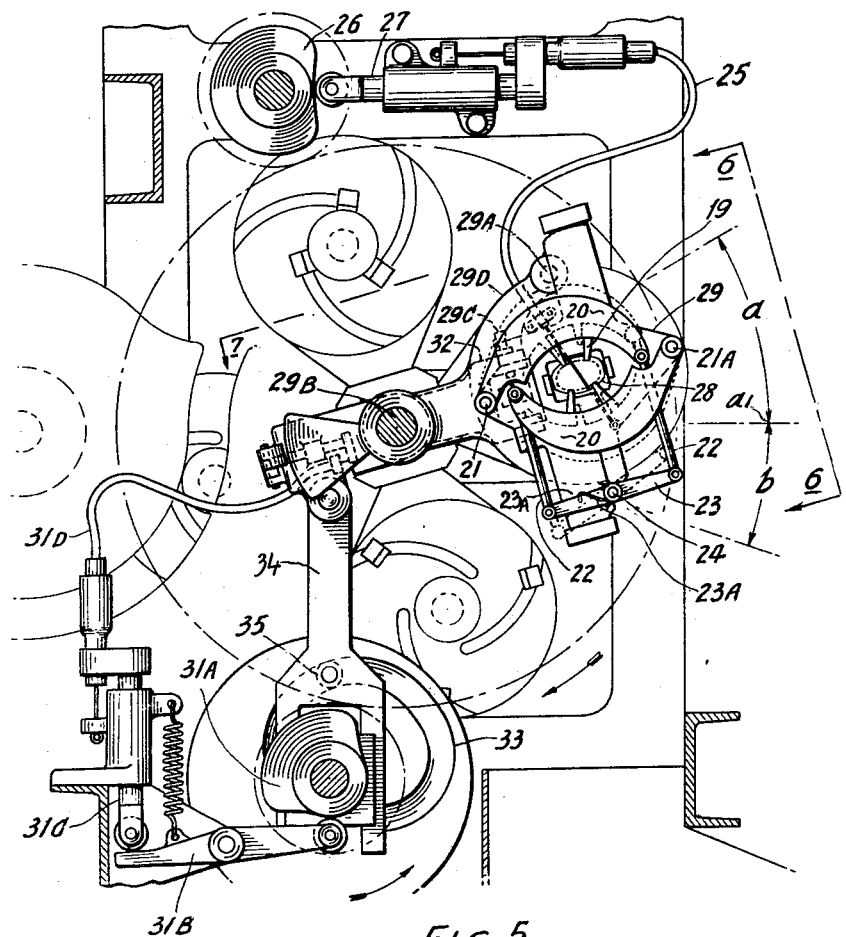
Figure 5 is an enlarged side elevation, on line 1—1 of Figure 2, of the pit-locating means and associated parts, portions of the fruit-carrying means being shown in relatively light and simple outline to indicate their relative positions.
Figure 6:
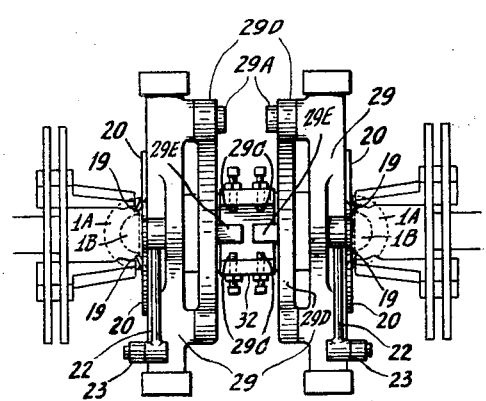
Figure 6 is an end elevation of the pit-locating means viewed from the line 6—6 in Figure 5, portions of the fruit-carrying means being shown in relatively light and simple outline.
Figure 7:
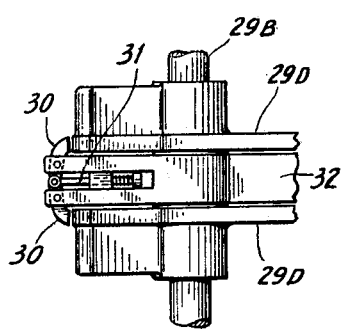
Figure 7 is a plan view of means for locking the pitting means in correct position after the pit-locating means has determined that position.

Suitable pit-splitting means will now be described in more detail. The pit-splitting means (Figures 1, 3 and 4) comprises a pair of blades 10 pivoted on a shaft 11 (Figure 2). Extensions of the blades are connected to links 13 arranged therewith in toggle formation and carrying a roller 14. A striker 15 is reciprocated by means of eccentric gear 16, or cam gear, actuating a cross bar 17 which carries the striker. When the fruit is brought into contact with the blades 10 and carried further around by the grippers, the blades swing about the shaft 11 against the action of a spring 18 and thus bring the roller 14 directly in the line of action of the striker 15 so that the roller and toggle links 13 are depressed by a blow of the striker and the blades 10 are forced towards each other by the toggle action as shown in Figure 4. This splits the pit and completes the cutting of the flesh so that the fruit is divided into two separate parts which are approximately halves of the fruit. This splitting enables the pits to be halved without the production of sawdust, which is extremely difficult to remove prior to canning. It also results in very little chipping of the pit. Obviously, the inclusion in the canned fruit of any foreign matter such as sawdust, or other small particles of pit, would seriously affect the reputation of the product but, with the pit-splitting means described, sawdust is not produced and any particles which may be broken away from the pit tend to be of relatively large size and are thus readily removable. Consequently, this pit-splitting means enables the pit to be divided into two approximate halves in a practical manner. Owing to the fact that the pit is successfully divided, means for locating the pit and for bringing the pitting blades into correct position in relation to the pit are made possible. The pit-locating means is so connected to the pitting means that the positioning of the pit-locating means by the half pit effects a corresponding movement of the pitting means and thus brings the latter into the correct position for severing the half pit from the flesh of the fruit. The correct positioning of the pitting blades in relation to the half pits facilitates the use of oppositely rotating blades by reducing the likelihood of their striking the pits and thus being damaged. The successful halving of the pits and the subsequent moving apart of the two halves of the fruit also enables the cutting blades to be much stronger and their operating means to be more robust than is possible with machines where the blades enter slits in the flesh of the fruit in order to sever the complete pits from the flesh. Consequently, the likelihood of pitting blades and associated mechanism being damaged, by the blades striking an abnormal pit, is reduced to a minimum. A very serious problem in fruit-pitting is thus solved. The pit-locating means and its association with the pitting means are described hereinafter. After the pit has been split two sets of grippers with the half fruit carried thereby are drawn apart from each other as, for example, by rollers working on a cam track as described in the specification of said Patent No. 1,726,685. The halves of the fruit are then moved somewhat inwards towards each other so that each half is brought into juxtaposition with pit-locating and pitting means as indicated in Figure 6. The pit-locating means (see Figures 5, 6 and 7) comprises two pairs of prongs 19 in respect of each half fruit, the prongs 19 being carried by arms 20 which are pivoted on a floating pitting member 29 at 21 and 21A. The arms are so connected that any movement of one arm is transferred to the other arm by making it operate in the exactly opposite direction. This reactive synchronisation is achieved by means of connecting rods 22 and lever 23, the latter being pivoted at 24. The arms 20 carrying the locating prongs are actuated by any suitable means as, for example, a bowden wire 25 operated by a cam 26 through a slide 27. The member 29 is pivoted at 29A to its balanced rocking arm 29D which pivots about main axis 29B. The aforementioned locating arms are mounted at 21 and 21A on the depending pitting member 29 in such a position that the operation of the locating arms brings the pitting blades 28 into correct alignment with the half pit prior to the actual pitting operation. The two rocking arms 29D are now locked by means of a locking device to a main pitting arm 32 which is common to both of these rocking arms and is actuated by means of a cam 33 through a connecting rod 34 and cam roller 35. The locking device consists of two locking levers 30 which when pressed against the rocking arms 29D by means of a plunger 31 lock them in a definite position in relation to each other. The movement of the plunger 31 is provided at the correct times by any suitable means as, for example, a cam 31A and associated lever 31B, slide 31C and Bowden wire 31D. A certain amount of lateral movement is provided, to enable the position of the pitting blades to be adjusted to a pit which is substantially out of the normal line of travel of the pit of the fruit, by the pivoting of portion of the pitting means, which houses the pitting blades and their actuating mechanism, to the corresponding floating pitting member 29 by means of the pin 29A, as abovementioned. Universal movement for locating the half pit is thus provided by the combination of the lateral movement of member 29 about pivot 29A and the vertical movement of rocking arm 29D about the pivot 29B, the latter being within the limits of stops 29C (Figures 5 and 6) the inner ends of which are adapted to contact with lugs 29E on the arms 29D and thus limit the movement of these arms. The slides 27 and 31C are provided with return springs (not shown).

Figure 8:
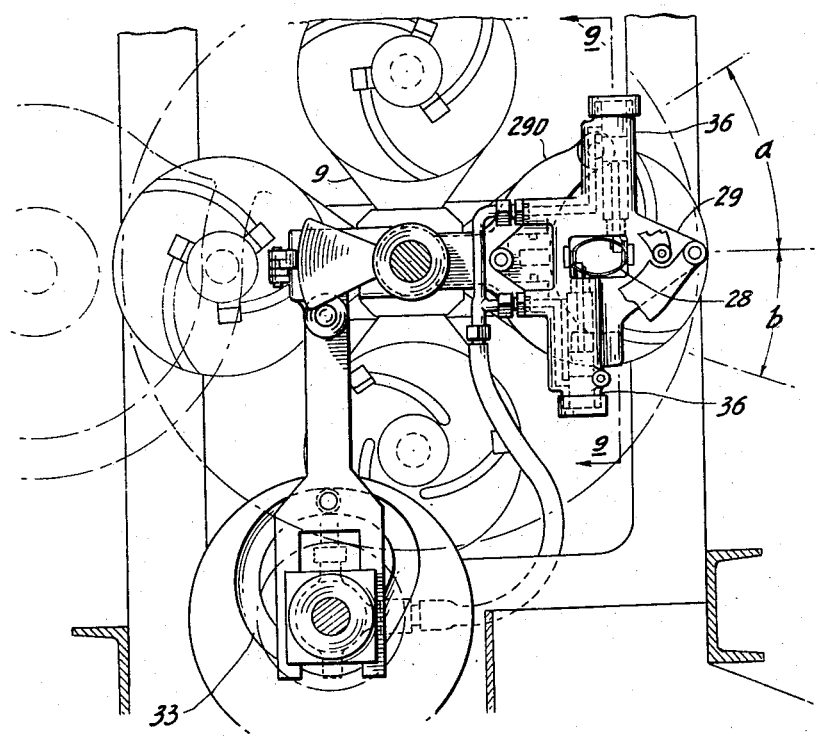
Figure 8 is an enlarged side elevation, on line 1—1 of Figure 2, of the pitting means and associated parts, the fruit-carrying means being indicated in relatively light and simple outline to indicate their relative positions.

The locating prongs 19 are now withdrawn from the flesh of the fruit by means of further movement of cam 26, operating Bowden wire 25, and thus allowing a return spring 23A to come into operation. The actual pitting of the fruit may now commence. During all the actions described the fruit is carried around continuously by the grippers. In Figures 5 and 8 the arc a represents approximately that portion of the travel in which the prongs of the locating means enter the flesh of the fruit and close upon the edge of the half pit, and in which the locking means is then actuated and the prongs withdrawn. The actual pitting is effected during that portion of the travel of the fruit indicated approximately by the arc b. The whole pitting unit travels with the fruit through the arcs a and b. In the actual pitting operation the pitting blades 28 are caused to cut around the pit by rotating them each through approximately 90 degrees by any suitable means.

The sequence of operations of the pit-locating members and pitting blades is indicated diagrammatically in Figures 9 to 15.

Figure 9:
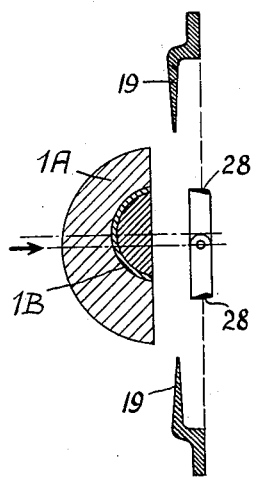
Figures 9 to 15 illustrate diagrammatically the sequence of operations of the pit-locating and pitting means.
Figure 10:
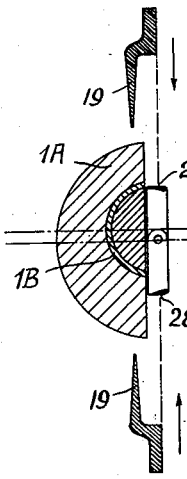

Figures 9 and 10 show the half fruit being moved into the pitting position, the centre line of the pit 1B being shown positioned at a distance X from its normal position in relation to the flesh 1A of the half fruit. Consequently the blades 28 in Figure 10 are this distance X out of their correct operative position in relation to the half pit.

The necessary adjustment is effected as follows:

Owing to the reactive synchronisation of the pivoted arms 20 (Figure 5) corresponding points on these arms are always equidistant from the axis of the pitting blades, which also are carried by the floating pitting member 29 (Figure 8). Neither of the arms 20 can move without the other in relation to the floating pitting member 29 on which they are pivoted. Consequently if a pit is somewhat out of position in a half fruit (see Figure 10) and the prongs 19 of one arm 20 thus engage the pit before the prongs of the opposite arm 20 can do so (see Figure 11) the closing of the two sets of prongs towards each other to engage the pit effects a movement of the floating pitting member 29 which brings the pitting blades into correct position in relation to the pit irrespectively of the position of the pit in the fruit (see Figure 12).

Figures 11, 12:
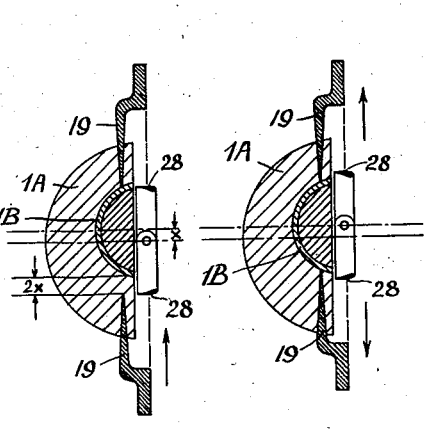
Figure 13:
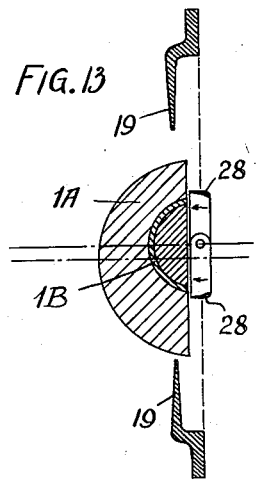
Figure 14:
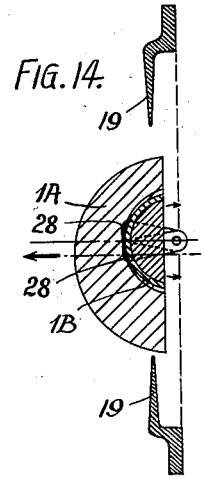
Figure 15:
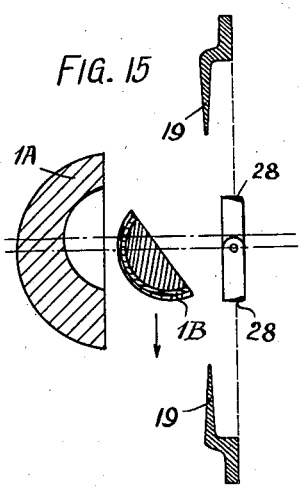

As the half pit at this stage is firmly embedded in the half fruit which is firmly held by the fruit carriers and as the latter must obviously carry round the half fruit in predetermined synchronisation with the main supporting structure of the pitting means, it will be obvious that no engagement of members with the half pit could be adapted to bring the pitting blades into correct location with the abnormally positioned half pit unless floating means were provided, in accordance with this invention, to permit adjustment of the position of the direct support of the pitting blades in relation to their main supporting structure. This adjusting movement is indicated in Figures 11 and 12. The pitting blades 28 before adjustment by the pit-locating means are at a distance X (see Figures 9, 10 and 11) from their correct position in relation to the abnormally positioned half pit. Consequently, in Figure 11 the upper prongs 19 have engaged the surface of the half pit while the lower prongs have still to travel a distance 2X for such engagement. As the upper prongs cannot move the half pit, the equal and opposite movement of the upper and lower prongs towards each other in relation to the floating member 29, which carries the arms 20 and their prongs 19 and also carries the pitting blades 28, causes a movement of the floating member 29 which thus moves the pitting blades 28 through a distance X to the correct position shown in Figure 12. The means carrying the pitting blades is locked in this position as hereinbefore described.

I claim:

1. In a fruit-pitting machine the combination of means for carrying the fruit, with means for dividing the flesh and pit into two approximate halves, a floating pitting member, pit-locating members carried by said floating pitting member and adapted to engage the outer face of a half pit, and pitting means carried by said floating pitting member and thus adapted to be brought by the engagement of said pit-locating members with said half pit into the correct pitting position in relation to said half pit.

2. In a fruit-pitting machine the combination of means for carrying the fruit, with means for dividing the flesh and pit into two approximate halves, a floating pitting member, pit-locating members carried by said floating pitting member and adapted to engage the outer face of a half pit, pitting means carried by said floating pitting member and thus adapted to be brought by the engagement of said pit-locating members with said half pit into the correct pitting position in relation to said half pit, and locking means adapted to lock said pitting means in said correct pitting position.

3. In a fruit-pitting machine the combination of means for carrying the fruit, with means for dividing the flesh and pit into two approximate halves, a floating pitting member, arms pivoted to said floating pitting member, pit locating prongs carried by said pivoted arms, reactive synchronising means connecting said pivoted arms and thus causing either of said pivoted arms to be moved in relation to the said floating pitting member to an extent equal and opposite to any such movement of the other pivoted arm, pitting blades carried by said floating pitting member, means adapted to swing said pivoted arms towards each other and thus cause said pit-locating prongs carried thereby to engage the outer face of the half pit and consequently to bring said floating pitting member and the pitting blades carried thereby into the correct pitting position in relation to said half pit, and means adapted to lock said floating pitting member in such correct position.

4. In a fruit-pitting machine the combination of means for carrying the fruit, with means for dividing the flesh and pit into two approximate halves, two sets of pit-locating and pitting elements, each set including a floating pitting member, arms pivoted to said floating pitting member, pit-locating prongs carried by said pivoted arms, reactive synchronizing means connecting said pivoted arms and thus causing either of said pivoted arms to be moved in relation to the said floating pitting member to an extent equal and opposite to any such movement of the other arm, pitting blades carried by said floating pitting member, means adapted to swing said pivoted arms towards each other and thus cause said pit-locating prongs carried thereby to engage the outer face of the half pit and consequently to bring said floating pitting member and the pitting blades carried thereby into the correct pitting position in relation to said half pit, and a balanced rocking arm to which said floating pitting member is pivoted, a main pitting arm common to both sets and locking means to lock both balanced rocking arms to said main pitting arm.

ALBERT STANLEY RIDLEY.